United States Patent
Xiong et al.

(10) Patent No.: US 11,308,942 B2
(45) Date of Patent: Apr. 19, 2022

(54) METHOD AND APPARATUS FOR OPERATING SMART TERMINAL

(71) Applicant: Baidu Online Network Technology (Beijing) Co., Ltd., Beijing (CN)

(72) Inventors: Qin Xiong, Beijing (CN); Gaofei Cheng, Beijing (CN); Leilei Gao, Beijing (CN); Fei Wang, Beijing (CN); Yue Liu, Beijing (CN); Wenlin Dong, Beijing (CN)

(73) Assignees: BAIDU ONLINE NETWORK TECHNOLOGY (BEIJING) CO., LTD., Beijing (CN); SHANGHAI XIAODU TECHNOLOGY CO. LTD., Shanghai (CN)

(*) Notice: Subject to any disclaimer, the term of this patent is extended or adjusted under 35 U.S.C. 154(b) by 393 days.

(21) Appl. No.: 16/505,667

(22) Filed: Jul. 8, 2019

(65) Prior Publication Data

US 2020/0082814 A1 Mar. 12, 2020

(30) Foreign Application Priority Data

Sep. 10, 2018 (CN) .......................... 201811053045.X

(51) Int. Cl.
*G10L 15/18* (2013.01)
*G10L 15/08* (2006.01)
*G10L 15/26* (2006.01)

(52) U.S. Cl.
CPC ........ *G10L 15/1822* (2013.01); *G10L 15/083* (2013.01); *G10L 15/26* (2013.01); *G10L 2015/088* (2013.01)

(58) Field of Classification Search
None
See application file for complete search history.

(56) References Cited

U.S. PATENT DOCUMENTS

| | | | | |
|---|---|---|---|---|
| 8,280,921 B2* | 10/2012 | Jones | .................... | G06F 16/951 |
| | | | | 707/805 |
| 9,342,626 B1* | 5/2016 | Das | .................... | G06F 16/9535 |
| 10,991,037 B1* | 4/2021 | Wooldridge | ....... | G06Q 30/0643 |
| 2012/0047164 A1* | 2/2012 | Saadat | .............. | G06F 16/24542 |
| | | | | 707/769 |
| 2015/0206534 A1* | 7/2015 | Shinkai | ................... | G10L 15/22 |
| | | | | 704/270.1 |

(Continued)

FOREIGN PATENT DOCUMENTS

| | | |
|---|---|---|
| CN | 107589826 A | 1/2018 |
| JP | 2015527683 A | 9/2015 |

*Primary Examiner* — Neeraj Sharma
(74) *Attorney, Agent, or Firm* — Lathrop GPM LLP

(57) ABSTRACT

Embodiments of the present disclosure relate to a method and apparatus for operating a smart terminal. The method for operating a smart terminal includes: parsing a currently inputted user voice command to a current text command; querying a historical text command record matching the current text command from a historical text command record set corresponding to a historical user voice command set; parsing the queried historical text command record to obtain a user's intention; sending a user request generated based on the user's intention to a resource database; and commanding an action component to take an action based on a response returned from the resource database and the user's intention.

17 Claims, 6 Drawing Sheets

(56) References Cited

U.S. PATENT DOCUMENTS

| | | | |
|---|---|---|---|
| 2016/0140232 A1* | 5/2016 | Smirnov | G06F 16/3338 |
| | | | 707/768 |
| 2017/0060994 A1* | 3/2017 | Byron | G06F 16/3344 |
| 2017/0199943 A1* | 7/2017 | Steelberg | G06F 16/9038 |
| 2018/0060301 A1* | 3/2018 | Li | G06N 3/08 |
| 2018/0095967 A1* | 4/2018 | Kota | G06N 20/10 |
| 2019/0291011 A1* | 9/2019 | Benedetto | A63F 13/30 |
| 2020/0274803 A1* | 8/2020 | Yang | G06F 16/24568 |

* cited by examiner

METHOD AND APPARATUS FOR OPERATING SMART TERMINAL

CROSS-REFERENCE TO RELATED APPLICATIONS

This application claims priority to Chinese Patent Application No. 201811053045.X, filed on Sep. 10, 2018, titled "Method and apparatus for operating smart terminal," which is hereby incorporated by reference in its entirety.

TECHNICAL FIELD

The present disclosure relates to the field of computer technology, specifically to the field of computer network technology, and more specifically to a method and apparatus for operating a smart terminal.

BACKGROUND

With the continuous growth of smart voice devices, how voice interaction better meets user demand has become a problem.

At present, the voice operation remains at a stage in which what is said is what is obtained. A server of a resource database completely resolves a command said by a user this time, and returns a final execution command corresponding to the resolved result to a smart device, so that the smart device executes an operation based on the execution command.

However, at present, names of some media resources are hardly understandable, and names of some media resources are very long. If a user would like to watch a TV play "For You, I Would Like XXXXXX," then the user needs to say to the smart device: "I would like to watch 'for you, I would like XXXXXX'" each time when following the TV play, and then the smart device may respond correctly. This brings inconveniences to the user.

SUMMARY

Embodiments of the present disclosure provide a method and apparatus for operating a smart terminal.

In a first aspect, an embodiment of the present disclosure provides a method for operating a smart terminal, including: parsing a currently inputted user voice command to a current text command; querying a historical text command record matching the current text command from a historical text command record set corresponding to a historical user voice command set; parsing the queried historical text command record to obtain a user's intention; sending a user request generated based on the user's intention to a resource database; and commanding an action component to take an action based on a response returned from the resource database and the user's intention.

In some embodiments, the querying a historical text command record matching the current text command from a historical text command record set corresponding to a historical user voice command set includes: performing word segmentation on the current text command to obtain a word sequence corresponding to the current text command; calculating a similarity between the word sequence and each historical text command record in the historical text command record set corresponding to the historical user voice command set; and acquiring a historical text command record having a highest similarity based on similarity in descending order, for use as the queried historical text command record.

In some embodiments, the querying a historical text command record matching the current text command from a historical text command record set corresponding to a historical user voice command set includes: querying the historical text command record matching the current text command from the historical text command record set corresponding to the historical user voice command set using a maximum matching algorithm.

In some embodiments, the historical user voice command is a user voice command stored within preset historical time.

In some embodiments, the commanding an action component to take an action based on a response returned from the resource database and the user's intention includes: prompting, if the response returned from the resource database indicates failure to parse a correct command, failure to parse the correct command to a user; and presenting, if the response returned from the resource database indicates the correct command resolved, the user with an operation indicated by the user's intention based on the resolved correct command.

In a second aspect, an embodiment of the present disclosure provides an apparatus for operating a smart terminal, including: a text parsing unit, configured to parse a currently inputted user voice command to a current text command; a record querying unit, configured to query a historical text command record matching the current text command from a historical text command record set corresponding to a historical user voice command set; an intention parsing unit, configured to parse the queried historical text command record to obtain a user's intention; a request sending unit, configured to send a user request generated based on the user's intention to a resource database; and an action executing unit, configured to command an action component to take an action based on a response returned from the resource database and the user's intention.

In some embodiments, the record querying unit is further configured to: perform word segmentation on the current text command to obtain a word sequence corresponding to the current text command; calculate a similarity between the word sequence and each historical text command record in the historical text command record set corresponding to the historical user voice command set; and acquire a historical text command record having a highest similarity based on similarity in descending order, for use as the queried historical text command record.

In some embodiments, the record querying unit is further configured to: query the historical text command record matching the current text command from the historical text command record set corresponding to the historical user voice command set using a maximum matching algorithm.

In some embodiments, the historical user voice command in the record querying unit is a user voice command stored within preset historical time.

In some embodiments, the action executing unit is further configured to: prompt, if the response returned from the resource database indicates failure to parse a correct command, failure to parse the correct command to a user; and present, if the response returned from the resource database indicates the correct command resolved, the user with an operation indicated by the user's intention based on the resolved correct command.

In a third aspect, an embodiment of the present disclosure provides a device, including: one or more processors; and a storage apparatus, configured to store one or more programs, where the one or more programs, when executed by the one or more processors, cause the one or more processors to implement the method according to any one of the above embodiments.

In a fourth aspect, an embodiment of the present disclosure provides a computer readable storage medium, storing a computer program thereon, where the program, when executed by a processor, implements the method according to any one of the above embodiments.

The method and apparatus for operating a smart terminal provided in the embodiments of the present disclosure first parse a currently inputted user voice command to a current text command; then query a historical text command record matching the current text command from a historical text command record set corresponding to a historical user voice command set; then parse the queried historical text command record to obtain a user's intention; then send a user request generated based on the user's intention to a resource database; and finally command an action component to complete an operation indicated by the user's intention based on a response returned from the resource database. In this process, the user command may be smartly complemented without the need for inputting a complete voice command by a user, and then information is pushed to the user based on latest cloud parsing result of the complemented user command, thereby reducing user's cost of using the smart voice device, improving user experience of the smart device, enhancing public praise of experience of smart voice, and promoting product-based implementation of the Artificial Intelligence (AI) technology.

BRIEF DESCRIPTION OF THE DRAWINGS

By reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
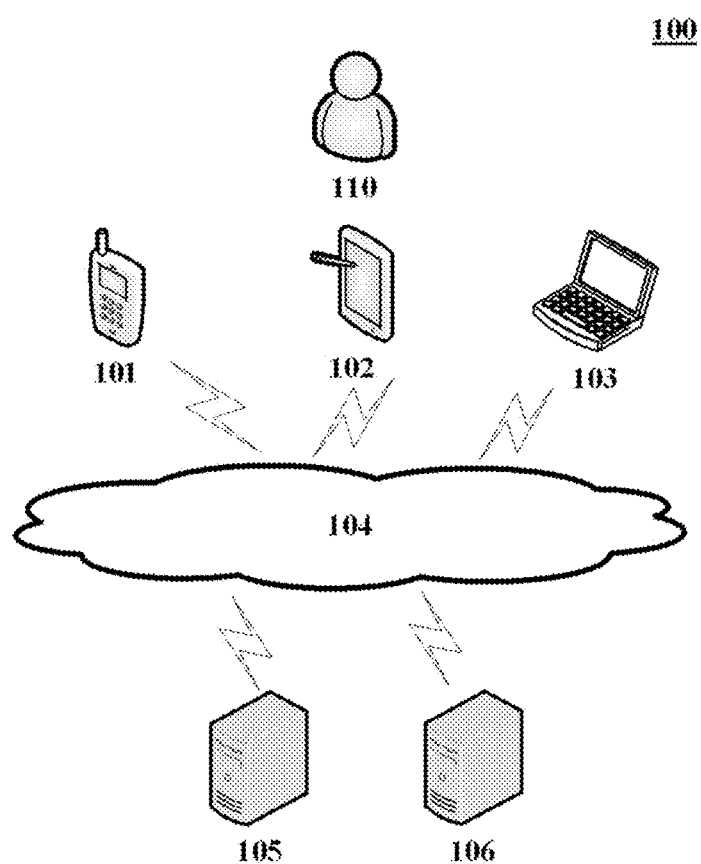
FIG. 1 is an architectural diagram of an exemplary system in which the present disclosure may be applied.

As shown in FIG. 1, a system architecture 100 may include terminal devices 101, 102 and 103, a network 104, and servers 105 and 106. The network 104 serves as a medium providing a communication link between the terminal devices 101, 102 and 103, and the servers 105 and 106. The network 104 may include various types of connections, such as wired or wireless communication links, or optical fibers.

A user 110 may interact with the servers 105 and 106 using the terminal devices 101, 102 and 103 through the network 104, to receive or send messages, etc. The terminal devices 101, 102 and 103 may be provided with various communication client applications, such as a video capturing application, a video playing application, an instant messaging tool, an email client, social platform software, a search engine application, and a shopping application.

The terminal devices 101, 102 and 103 may be various electronic devices having display screens, including but not limited to smart phones, tablet PCs, e-book readers, MP3 (Moving Picture Experts Group Audio Layer III) players, MP4 (Moving Picture Experts Group Audio Layer IV) players, laptop portable computers, desktop computers, and so on.

The servers 105 and 106 may be servers providing various services, such as backend servers providing support for the terminal devices 101, 102 and 103. The backend servers may process, e.g., analyze, store, or calculate, data submitted by the terminals, and push the analyzing, storage, or calculation result to the terminal devices.

It should be noted that in practice, the method for operating a smart terminal provided in the embodiments of the present disclosure is generally executed by the servers 105 and 106. Accordingly, the apparatus for operating a smart terminal is generally provided in the servers 105 and 106. However, when the performances of the terminal devices meet execution conditions of the method or setting conditions of the apparatus, the method for operating a smart terminal provided in the embodiments of the present disclosure may also be executed by the terminal devices 101, 102, and 103, and the apparatus for operating a smart terminal may also be provided in the terminal devices 101, 102 and 103.

It should be understood that the numbers of terminals, networks, and servers in FIG. 1 are merely illustrative. Any number of terminals, networks, and servers may be provided based on actual requirements.

Figure 2:
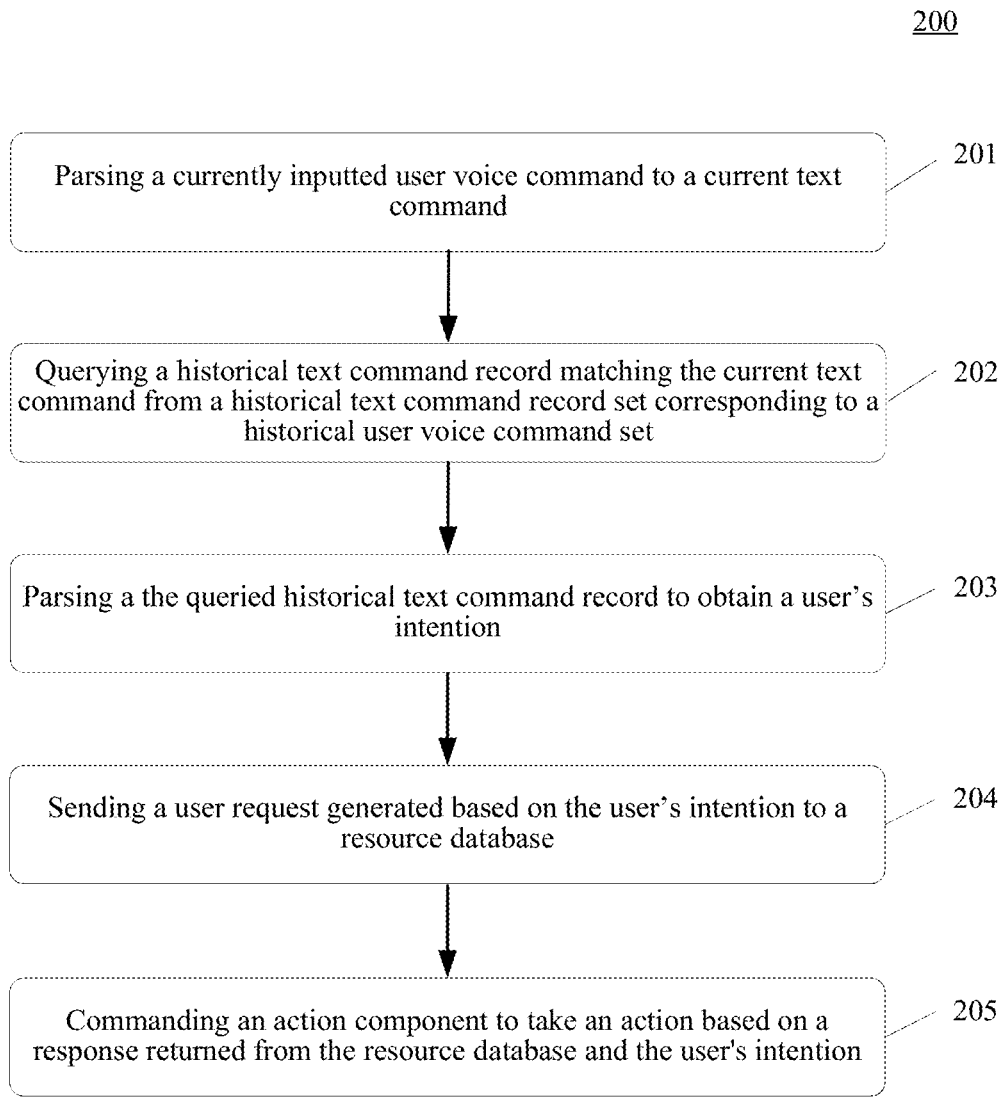
FIG. 2 is a schematic flowchart of an embodiment of a method for operating a smart terminal according to an embodiment of the present disclosure.

Further referring to FIG. 2, a process 200 of an embodiment of a method for operating a smart terminal according to the present disclosure is shown. The method for operating a smart terminal includes the following steps.

Step 201: Parsing a currently inputted user voice command to a current text command.

In the present embodiment, an electronic device (e.g., the server or terminal shown in FIG. 1) whereon the above method for operating a smart terminal runs may acquire a far-field voice by a microphone array, or acquire a near-field voice by a microphone, thereby acquiring a user voice command inputted by a user. Then, a user voice interaction command may be converted into a current text command, and error correction and adjustment of some known errors are performed.

In a specific example, a currently inputted user voice command may be "I would like to watch 'for you'," and then, the user voice command may be resolved to a current text command "I would like to watch 'for you'."

In some alternative implementations of the present embodiment, a historical user voice command is a user voice command stored within preset historical time.

In the present implementation, the currently inputted user voice command may be stored in a historical text command record set. The historical text command record set may store user voice commands inputted within the preset historical time, for example, may store user voice commands inputted within a month, a week, or a day.

Step 202: Querying a historical text command record matching the current text command from a historical text command record set corresponding to a historical user voice command set.

In the present embodiment, a best matching historical text command record with complemented voice may be queried from a historical text command record set corresponding to a historical user voice command set using a matching algorithm with the current text command obtained in step 201 as input.

In a specific example, the current text command is "I would like to watch 'for you'," and the best matching historical text command record with complemented voice queried from the historical text command record set corresponding to the historical user voice command set is "I would like to watch 'for you, I would like XXXXXX'."

In an alternative implementation of the present embodiment, the querying a historical text command record matching the current text command from a historical text command record set corresponding to a historical user voice command set includes: performing word segmentation on the current text command to obtain a word sequence corresponding to the current text command; calculating a similarity between the word sequence and each historical text command record in the historical text command record set corresponding to the historical user voice command set; and acquiring a historical text command record having a highest similarity based on similarity in descending order, for use as a queried historical text command record.

In the present implementation, the word segmentation means to segmenting the current text command into separate words to obtain a word sequence. For the historical text command record set corresponding to the historical user voice command set, the similarity between the word sequence and each historical text command record may be compared, and the historical text command record having the highest similarity may be acquired based on similarity in the descending order, for use as the queried historical text command record.

Step 203: Parsing a queried historical text command record to obtain a user's intention.

In the present embodiment, the complemented historical text command record may be resolved to obtain a user's intention. This parsing operation may be completed locally or in a cloud server. For example, the complemented command may be sent to a parsing server for parsing, to obtain latest parsing result returned by the parsing server.

During parsing, the historical text command record with complemented voice may be processed by word segmentation, semantic understanding, etc., to accurately capture the intention to be expressed by a user and a subject to be identified by the user.

In a specific example, for the queried historical text command record "I would like to watch 'for you, I would like XXXXXX'," word segmentation and semantic understanding may be performed to obtain a subject "I", an optative word "would like", an action "watch," and an object name "for you, I would like XXXXXX" in the intention to be expressed by the user.

It should be understood that, the parsing result here is the latest parsing result. Because a parsing database or parsing dictionary used for parsing is updated continuously, for a given historical text command record, different parsing results may be obtained by parsing the given historical text command record. For example, for a movie being updated, the wording that I would like to watch XXX may mean that I would like to watch a new movie XXX2.

Step 204: Sending a user request generated based on the user's intention to a resource database.

In the present embodiment, after parsing the user's intention in step 203, a user request generated based on the user's intention may be sent to a resource database. It should be understood that the resource database may also be in the cloud or located locally. If both the resource database and a module running the parsing operation are in the cloud, then the resource database and the module running the parsing operation may be in a given server or different servers.

In a specific example, a request for acquiring "I would like XXXXXX" generated based on the user's intention "I would like to watch 'for you, I would like XXXXXX'" may be sent to the resource database.

Step 205: Commanding an action component to take an action based on a response returned from the resource database and the user's intention.

In the present embodiment, the next operation may be determined based on a response returned from the resource database: if no correct command is resolved, then failure to parse a correct command may be prompted to the user, while if the correct command is resolved, then in this case, a resource returned from the response is a resource requested by the user, and an operation indicated by the user's intention may be presented to the user.

In a specific example, after obtaining a latest resource of the response "I would like XXXXXX" returned from the resource database, the latest resource "I would like XXXXXX" may be played based on "I," "would like," "watch," and "I would like XXXXXX" in the user's intention.

The method for operating a smart terminal provided in the above embodiments of the present disclosure first resolves a currently inputted user voice command to a current text command; then queries a historical text command record matching the current text command from a historical text command record set corresponding to a historical user voice command set; then resolves a queried historical text command record to obtain a user's intention; then sends a user request generated based on the user's intention to a resource database; and finally commands an action component to complete an operation indicated by the user's intention based on a response returned from the resource database. In this process, the user command may be smartly complemented without the need for inputting a complete voice command by a user, and then information is pushed to the user based on the latest parsing result of the complemented user command, thereby reducing user's cost of using the smart voice device, improving user experience of the smart device, enhancing public praise of experience of smart voice, and promoting product-based implementation of the AI technology.

Figure 3:
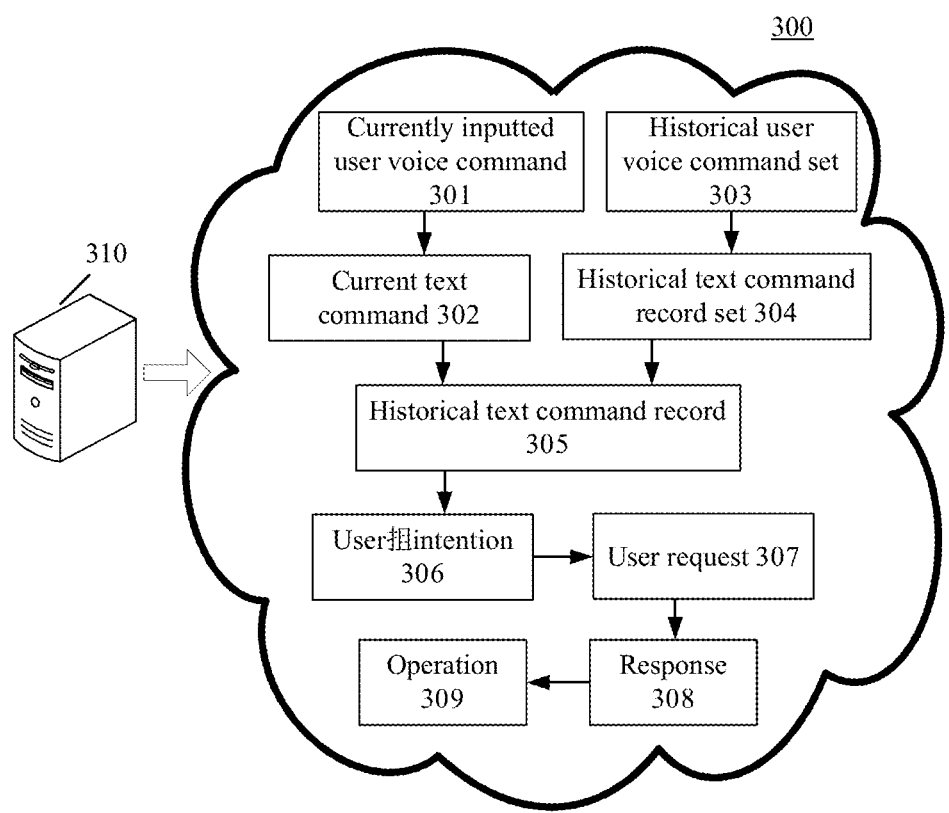
FIG. 3 is a schematic diagram of an application scenario of the method for operating a smart terminal according to an embodiment of the present disclosure.

Further referring to FIG. 3, an exemplary application scenario of the method for operating a smart terminal of the present disclosure is described.

FIG. 3 shows a schematic flowchart of an application scenario of the method for operating a smart terminal according to the present disclosure.

As shown in FIG. 3, the method 300 for operating a smart terminal runs in an electronic device 310, and may include the following steps.

First, parsing a currently inputted user voice command 301 to a current text command 302; then, querying a historical text command record 305 matching the current text command 302 from a historical text command record set 304 corresponding to a historical user voice command set 303; then, parsing a queried historical text command record 305 to obtain a user's intention 306; then, sending a user request 307 generated based on the user's intention to a resource database; and finally, commanding an action component to complete an operation 309 indicated by the user's intention based on a response 308 returned from the resource database.

It should be understood that the application scenario of the method for operating a smart terminal as shown in the above FIG. 3 is merely exemplary description of the method for operating a smart terminal, and does not represent limit to the method. For example, the steps shown in the above FIG. 3 may further employ an implementation method in more detail.

Figure 4:
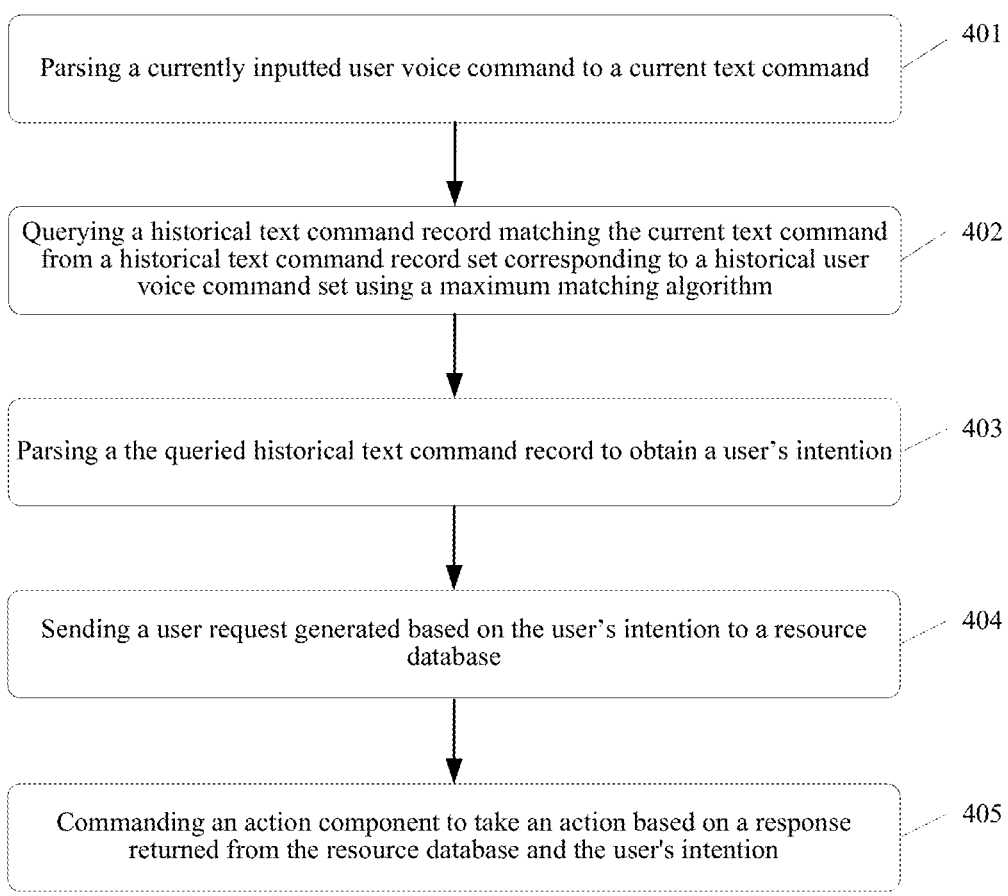
FIG. 4 is a schematic flowchart of another embodiment of the method for operating a smart terminal according to an embodiment of the present disclosure.

Further referring to FIG. 4, a process of an embodiment of the method for operating a smart terminal according to the present disclosure is shown.

As shown in FIG. 4, the method 400 for operating a smart terminal includes the following steps.

Step 401: Parsing a currently inputted user voice command to a current text command.

In the present embodiment, an electronic device (e.g., the server or terminal shown in FIG. 1) whereon the above method for operating a smart terminal runs may acquire a far-field voice by a microphone array, or acquire a near-field voice by a microphone, thereby acquiring a user voice command inputted by a user. Then, a user voice interaction command may be converted into a current text command, and error correction and adjustment of some known errors are performed.

In a specific example, a currently inputted user voice command may be "I would like to watch 'for you'," and then, the user voice command may be resolved to a current text command "I would like to watch 'for you'."

In some alternative implementations of the present embodiment, a historical user voice command is a user voice command stored within preset historical time.

In the present implementation, the currently inputted user voice command may be stored in a historical text command record set. The historical text command record set may store user voice commands inputted within the preset historical time, for example, may store user voice commands inputted within a month, a week, or a day.

Step 402: Querying a historical text command record matching the current text command from a historical text command record set corresponding to a historical user voice command set using a maximum matching algorithm.

In the present embodiment, a best matching historical text command record with complemented voice may be queried from a historical text command record set corresponding to a historical user voice command set using a maximum matching algorithm with the current text command obtained in step 401 as input.

The maximum matching algorithm here mainly includes a forward maximum matching algorithm, a reverse maximum matching algorithm, a two-way matching algorithm, and the like. The main principle is to segment into a separate word string, then compare with a thesaurus, and record it if it is a phrase, or otherwise continue comparison by increasing or decreasing a separate word, terminate until one separate word is left, and process it as no login if the separate word string cannot be segmented. The maximum matching principle is to find a longest matching character string in the thesaurus for use as one word. For example, word segmentation of "I was born in ABCDEFG" is performed based on the maximum matching principle, and the word segmentation result is "I," "born," "in," and "ABCDEFG," instead of "I," "born," "in," "AB," "CD," and "EFG."

In a specific example, the current text command is "I would like to watch 'for you'," and the best matching historical text command record with complemented voice queried from the historical text command record set corresponding to the historical user voice command set using the maximum matching algorithm is "I would like to watch 'for you, I would like XXXXXX'."

Step 403: Parsing the queried historical text command record to obtain a user's intention.

In the present embodiment, the complemented historical text command record may be resolved to obtain a user's intention. This parsing operation may be completed locally or in a cloud server. For example, the complemented command may be sent to a parsing server for parsing, to obtain latest parsing result returned by the parsing server.

During parsing, the historical text command record with complemented voice may be processed by word segmentation, semantic understanding, etc., to accurately capture the intention to be expressed by a user and a subject to be identified by the user.

In a specific example, for the queried historical text command record "I would like to watch 'for you, I would like XXXXXX'," word segmentation and semantic understanding may be performed to obtain a subject "I", an optative word "would like", an action "watch," and an object name "for you, I would like XXXXXX" in the intention to be expressed by the user.

It should be understood that, the parsing result here is the latest parsing result. Because a parsing database or parsing dictionary used for parsing is updated continuously, for a given historical text command record, different parsing results may be obtained by parsing the given historical text command record. For example, for a movie being updated, the wording that I would like to watch XXX may mean that I would like to watch a new movie XXX2.

Step 404: Sending a user request generated based on the user's intention to a resource database.

In the present embodiment, after parsing the user's intention in Step 403, a user request generated based on the user's intention may be sent to a resource database. It should be understood that the resource database may also be in the cloud or located locally. If both the resource database and a module running the parsing operation are in the cloud, then the resource database and the module running the parsing operation may be in a given server or different servers.

In a specific example, a request for acquiring "I would like XXXXXX" generated based on the user's intention "I would like to watch 'for you, I would like XXXXXX'" may be sent to the resource database.

Step 405: Commanding an action component to take an action based on a response returned from the resource database and the user's intention.

In the present embodiment, the next operation may be determined based on a response returned from the resource database: if no correct command is resolved, then failure to parse a correct command may be prompted to the user, while if the correct command is resolved, then in this case, a resource returned from the response is a resource requested by the user, and an operation indicated by the user's intention may be presented to the user.

In a specific example, after obtaining a latest resource of the response "I would like XXXXXX" returned from the resource database, the latest resource "I would like XXXXXX" may be played based on "I," "would like," "watch," and "I would like XXXXXX" in the user's intention.

The method for operating a smart terminal provided in the above embodiments of the present disclosure first resolves a currently inputted user voice command to a current text command; then queries a historical text command record matching the current text command from a historical text command record set corresponding to a historical user voice command set using a maximum matching algorithm; then resolves a queried historical text command record to obtain a user's intention; then sends a user request generated based on the user's intention to a resource database; and finally commands an action component to complete an operation indicated by the user's intention based on a response returned from the resource database. In this process, the user command may be smartly complemented using the maximum matching algorithm without the need for inputting a complete voice command by a user, thereby improving the completeness of the complemented user command. Then, information is pushed to the user based on the latest parsing result of the complemented user command, thereby reducing user's cost of using the smart voice device, improving user experience of the smart device, enhancing public praise of experience of smart voice, and promoting product-based implementation of the AI technology.

Figure 5:
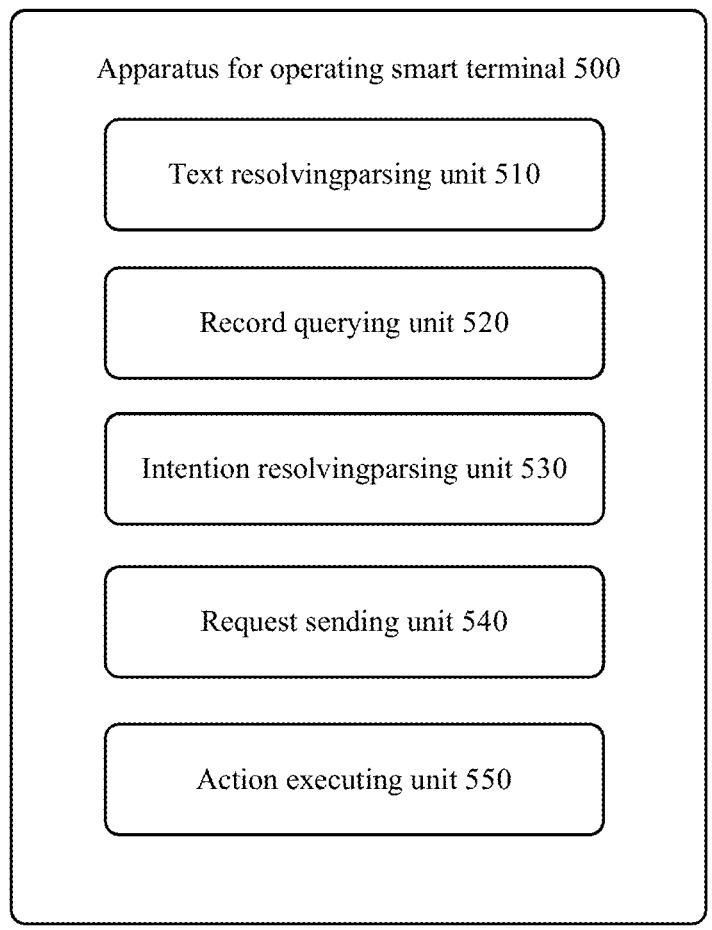
FIG. 5 is a schematic structural diagram of an embodiment of an apparatus for operating a smart terminal according to an embodiment of the present disclosure.

Further referring to FIG. 5, as an implementation of the method shown in the above figures, the present disclosure provides an embodiment of an apparatus for operating a smart terminal. The embodiment of the apparatus corresponds to the embodiments of the method shown in FIG. 1 to FIG. 4, and the apparatus may be specifically applied to various electronic devices.

As shown in FIG. 5, the apparatus 500 for operating a smart terminal of the present embodiment may include: a text parsing unit 510, configured to parse a currently inputted user voice command to a current text command; a record querying unit 520, configured to query a historical text command record matching the current text command from a historical text command record set corresponding to a historical user voice command set; an intention parsing unit 530, configured to parse a queried historical text command record to obtain a user's intention; a request sending unit 540, configured to send a user request generated based on the user's intention to a resource database; and an action executing unit 550, configured to command an action component to take an action based on a response returned from the resource database and the user's intention.

In some alternative implementations of the present embodiment, the record querying unit 520 is further configured to: perform word segmentation on the current text command to obtain a word sequence corresponding to the current text command; calculate a similarity between the word sequence and each historical text command record in the historical text command record set corresponding to the historical user voice command set; and acquire a historical text command record having a highest similarity based on similarity in descending order, for use as the queried historical text command record.

In some alternative implementations of the present embodiment, the record querying unit 520 is further configured to: query the historical text command record matching the current text command from the historical text command record set corresponding to the historical user voice command set using a maximum matching algorithm.

In some alternative implementations of the present embodiment, a historical user voice command in the record querying unit 520 is a user voice command stored within preset historical time.

In some alternative implementations of the present embodiment, the action executing unit 550 is further configured to: prompt, if the response returned from the resource database indicates failure to parse a correct command, failure to parse the correct command to a user; and present, if the response returned from the resource database indicates the correct command resolved, the user with an operation indicated by the user's intention based on the resolved correct command.

It should be understood that the units disclosed in the apparatus 500 may correspond to the steps in the method described in FIG. 1 to FIG. 4. Therefore, the operations and characteristics described above for the method also apply to the apparatus 500 and the units included therein, and will not be repeated here.

Figure 6:
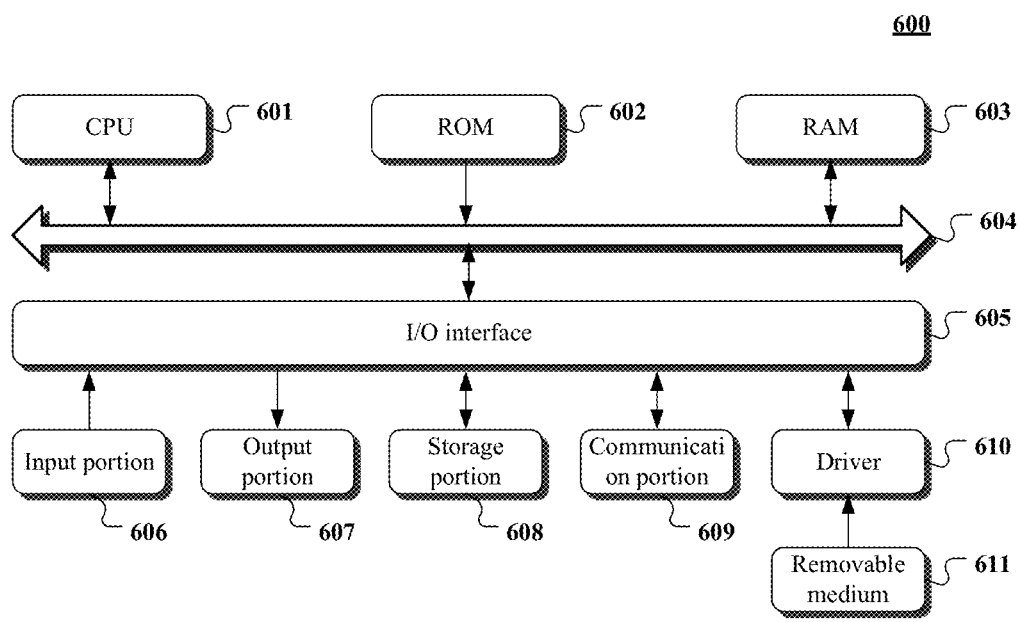
FIG. 6 is a schematic structural diagram of a computer system adapted to implement a server of embodiments of the present disclosure.

Referring to FIG. 6, a schematic structural diagram of a computer system 600 adapted to implement a server of embodiments of the present disclosure is shown. The terminal device or server shown in FIG. 6 is merely an example, and should not limit the functions and scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, or the like; an output portion 607 including a cathode ray tube (CRT), a liquid crystal display device (LCD), a speaker, or the like; a storage portion 608 including a hard disk or the like; and a communication portion 609 including a network interface card, such as a LAN card and a modem. The communication portion 609 performs communication processes via a network, such as the Internet. The drive 610 is also connected to the I/O interface 605 as required. A removable medium 611, such as a magnetic disc, an optical disc, and a semiconductor memory, may be installed on the driver 610, so that a computer program read therefrom is installed on the storage portion 608 as needed.

In particular, according to embodiments of the present disclosure, the process described above with reference to the flow chart may be implemented in a computer software program. For example, an embodiment of the present disclosure includes a computer program product, which includes a computer program that is tangibly embedded in a computer readable medium. The computer program includes program codes for executing the method as illustrated in the flow chart. In such an embodiment, the computer program may be downloaded and installed from a network via the communication portion 609, and/or may be installed from the removable medium 611. The computer program, when executed by the central processing unit (CPU) 601, implements the functions as defined by the method of the present disclosure. It should be noted that the computer readable medium according to the present disclosure may be a computer readable signal medium or a computer readable storage medium or any combination of the above two. An example of the computer readable storage medium may include, but is not limited to: an electric, magnetic, optical, electromagnetic, infrared, or semiconductor system, apparatus, element, or a combination of any of the above. A more specific example of the computer readable storage medium may include, but is not limited to: electrical connection with one or more wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory or any suitable combination of the above. In the present disclosure, the computer readable storage medium may be any tangible medium containing or storing programs which may be used by a command execution system, apparatus or element or incorporated thereto. In the present disclosure, the computer readable signal medium may include data signal in the base band or propagating as a part of a carrier wave, in which computer readable program codes are carried. The propagating data signal may take various forms, including but not limited to: an electromagnetic signal, an optical signal, or any suitable combination of the above. The computer readable signal medium may also be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be executed in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor including a text parsing unit, a record querying unit, an intention parsing unit, a request sending unit, and an action executing unit. Here, the names of these units do not constitute a limitation to such units themselves in some cases. For example, the text parsing unit may also be described as "a unit for parsing a currently inputted user voice command to a current text command."

In another aspect, the present disclosure further provides a computer readable medium. The computer readable medium may be included in the apparatus in the above described embodiments, or a stand-alone computer readable medium without being assembled into the apparatus. The computer readable medium stores one or more programs. The one or more programs, when executed by the apparatus, cause the apparatus to: parse a currently inputted user voice command to a current text command; query a historical text command record matching the current text command from a historical text command record set corresponding to a historical user voice command set; parse a queried historical text command record to obtain a user's intention; send a user request generated based on the user's intention to a resource database; and command an action component to take an action based on a response returned from the resource database and the user's intention.

The above description only provides an explanation of the preferred embodiments of the present disclosure and the employed technical principles. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure, for example, technical schemes formed by the above-described features being interchanged with, but not limited to, technical features with similar functions disclosed in the present disclosure.

What is claimed is:

1. A method for operating a smart terminal, comprising:
    parsing a currently inputted user voice command to a current text command;
    querying a historical text command record matching the current text command from a historical text command record set corresponding to a historical user voice command set by: performing word segmentation on the current text command to obtain a word sequence corresponding to the current text command; calculating a similarity between the word sequence and each historical text command record in the historical text command record set corresponding to the historical user voice command set; and acquiring a historical text command record having a highest similarity based on similarity in descending order, for use as the queried historical text command record;
    parsing the queried historical text command record to obtain a user's intention;
    sending a user request generated based on the user's intention to a resource database; and
    commanding an action component to take an action based on a response returned from the resource database, and the user's intention.

2. The method according to claim 1, wherein the querying a historical text command record matching the current text command from a historical text command record set corresponding to a historical user voice command set comprises:
    querying the historical text command record matching the current text command from the historical text command record set corresponding to the historical user voice command set using a maximum matching algorithm.

3. The method according to claim 1, wherein the historical user voice command is a user voice command stored within preset historical time.

4. The method according to claim 1, wherein the commanding an action component to take an action based on a response returned from the resource database and the user's intention comprises:
prompting, if the response returned from the resource database indicates failure to parse a correct command, failure to parse the correct command to a user; and
presenting, if the response returned from the resource database indicates the correct command resolved, the user with an operation indicated by the user's intention based on the resolved correct command.

5. The method according to claim 1, wherein the commanding an action component to take an action based on a response returned from the resource database and the user's intention comprises:
prompting, if the response returned from the resource database indicates failure to parse a correct command, failure to parse the correct command to a user; and
presenting, if the response returned from the resource database indicates the correct command resolved, the user with an operation indicated by the user's intention based on the resolved correct command.

6. The method according to claim 2 wherein the commanding an action component to take an action based on a response returned from the resource database and the user's intention comprises:
prompting, if the response returned from the resource database indicates failure to parse a correct command, failure to parse the correct command to a user; and
presenting, if the response returned from the resource database indicates the correct command resolved, the user with an operation indicated by the user's intention based on the resolved correct command.

7. The method according to claim 3, wherein the commanding an action component to take an action based on a response returned from the resource database and the user's intention comprises:
prompting, if the response returned from the resource database indicates failure to parse a correct command, failure to parse the correct command to a user; and
presenting, if the response returned from the resource database indicates the correct command resolved, the user with an operation indicated by the user's intention based on the resolved correct command.

8. An apparatus for operating a smart terminal, comprising:
at least one processor; and
a memory storing instructions, wherein the instructions when executed by the at least one processor, cause the at least one processor to perform operations, the operations comprising:
parsing a currently inputted user voice command to a current text command;
querying a historical text command record matching the current text command from a historical text command record set corresponding to a historical user voice command set by: performing word segmentation on the current text command to obtain a word sequence corresponding to the current text command; calculating a similarity between the word sequence and each historical text command record in the historical text command record set corresponding to the historical user voice command set; and acquiring a historical text command record having a highest similarity based on similarity in descending order, for use as the queried historical text command record;
parsing the queried historical text command record to obtain a user's intention;
sending a user request generated based on the user's intention to a resource database; and
commanding an action component to take an action based on a response returned from the resource database, and the user's intention.

9. The apparatus according to claim 8 wherein the querying a historical text command record matching the current text command from a historical text command record set corresponding to a historical user voice command set comprises:
querying the historical text command record matching the current text command from the historical text command record set corresponding to the historical user voice command set using a maximum matching algorithm.

10. The apparatus according to claim 8 wherein the historical user voice command is a user voice command stored within preset historical time.

11. The apparatus according to claim 8 wherein the commanding an action component to take an action based on a response returned from the resource database and the user's intention comprises:
prompting, if the response returned from the resource database indicates failure to parse a correct command, failure to parse the correct command to a user; and
presenting, if the response returned from the resource database indicates the correct command resolved, the user with an operation indicated by the user's intention based on the resolved correct command.

12. The apparatus according to claim 8, wherein the commanding an action component to take an action based on a response returned from the resource database and the user's intention comprises:
prompting, if the response returned from the resource database indicates failure to parse a correct command, failure to parse the correct command to a user; and
presenting, if the response returned from the resource database indicates the correct command resolved, the user with an operation indicated by the user's intention based on the resolved correct command.

13. The apparatus according to claim 9, wherein the commanding an action component to take an action based on a response returned from the resource database and the user's intention comprises:
prompting, if the response returned from the resource database indicates failure to parse a correct command, failure to parse the correct command to a user; and
presenting, if the response returned from the resource database indicates the correct command resolved, the user with an operation indicated by the user's intention based on the resolved correct command.

14. A non-transitory computer readable medium, storing a computer program thereon, wherein the program, when executed by a processor, implements operations, the operations comprising:
parsing a currently inputted user voice command to a current text command;
querying a historical text command record matching the current text command from a historical text command record set corresponding to a historical user voice command set by: performing word segmentation on the current text command to obtain a word sequence corresponding to the current text command: calculating a similarity between the word sequence and each historical text command record in the historical text command record set corresponding to the historical user voice command set; and acquiring a historical text command record having a highest similarity based on similarity in descending order, for use as the queried historical text command record;

parsing the queried historical text command record to obtain a user's intention;

sending a user request generated based on the user's intention to a resource database; and commanding an action component to take an action based on a response returned from the resource database, and the user's intention.

15. The non-transitory computer readable medium according to claim 14, wherein the querying a historical text command record matching the current text command from a historical text command record set corresponding to a historical user voice command set comprises:

querying the historical text command record matching the current text command from the historical text command record set corresponding to the historical user voice command set using a maximum matching algorithm.

16. The non-transitory computer readable medium according to claim 14, wherein the historical user voice command is a user voice command stored within preset historical time.

17. The non-transitory computer readable medium according to claim 14, wherein the commanding an action component to take an action based on a response returned from the resource database and the user's intention comprises:

prompting, if the response returned from the resource database indicates failure to parse a correct command, failure to parse the correct command to a user; and presenting, if the response returned from the resource database indicates the correct command resolved, the user with an operation indicated by the user's intention based on the resolved correct command.

* * * * *